July 14, 1942.　　　K. O. KEEL ET AL　　　2,289,654

SHIP DRIVE AND CONTROL SYSTEM

Filed Oct. 24, 1941　　　4 Sheets-Sheet 1

Inventor
Knut O. Keel,
Charles H. Fike &
William E. Brill
By Blackmor, Spencer & Flint
Attorneys July 14, 1942.  K. O. KEEL ET AL  2,289,654
SHIP DRIVE AND CONTROL SYSTEM
Filed Oct. 24, 1941  4 Sheets-Sheet 3

Inventor
Knut O. Keel,
Charles H. Fike &
William E. Brill
By
Blackmore, Spencer & Hiert
Attorneys Patented July 14, 1942

2,289,654

UNITED STATES PATENT OFFICE 2,289,654

SHIP DRIVE AND CONTROL SYSTEM

Knut O. Keel, Charles H. Fike, and William E. Brill, Cleveland, Ohio, assignors to General Motors Corporation, Detroit, Mich., a corporation of Delaware Application October 24, 1941, Serial No. 416,312

9 Claims. (Cl. 60—97)

The present invention relates generally to ship drive and control systems and more particularly relates to control means for multiengined ships in which a plurality of reversible engines are operatively connected to drive individual propellers of the ship.

The use of a plurality of engines rather than a single engine affords more protection in case of engine failure but requires suitable control means whereby the speed, torque and output and also the reverse operation of a single engine or a plurality of engines may be conveniently and precisely controlled to enable operation of the ship from different control stations to take care of any emergency arising from failure of engines or controls or any operating condition encountered by the ship.

The present invention has for its principal object the provision of a plurality of reversible engines which may be efficiently operated and accurately controlled individually or in multiple by either simple independent or master control means or emergency control means as desired.

The combined means by which the above object is accomplished will be better understood by referring to the following detailed description and accompanying drawings illustrating the invention and by reference to our co-pending application S. N. 400,482, filed June 30, 1941, in which some of the specific details of the mechanisms generally shown and described in the present invention are specifically described and illustrated in more detail.

Figure 1 of the drawings shows in plan view the general arrangement of the drive and control system as applied to a multiple propeller ship.

Figure 1:
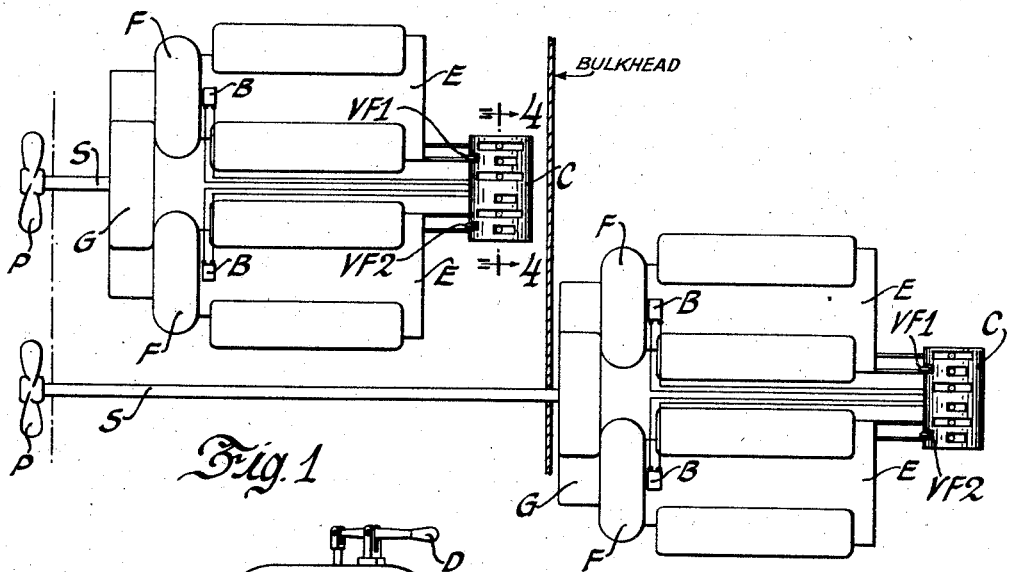

Referring now to the general arrangement of the combined drive and control system shown in Figure 1, a plurality of engines E are shown individually connected by means of individual fluid couplings F to a reduction gear G by which a single ship's propeller shaft S and propeller P are driven. In the arrangement shown two propeller shafts are shown, each of which is driven by a pair of engines through individual fluid couplings and a single reduction gear. With such an arrangement it will be evident that one propeller shaft may be driven by a single engine by draining one of the fluid couplings by the conventional draining mechanism provided on the couplings.

Engine control stands are shown at C, each of which, as will be subsequently described, includes independent engine control means and master control means for simultaneously controlling each pair of engines in multiple which drive a single propeller. The engines shown are of the air started reversible Diesel type and each engine is shown provided with braking means B of any well known type which may be controlled remotely by any well known mechanism from the control stand. Each engine braking means is shown connected by individual electrical control connections to a control stand C in which, as will be described, are individual control switches for each engine braking means. The individual engine air operated reversing means, starting and fuel varying means are also connected by control linkage, to be described, shown extending between the engines and control stands.

The individual propeller shaft driving means comprising pairs of engines E and fluid couplings F and the single reduction gear G, as best shown in Figure 1, and a control stand C therefor are located in different watertight compartments separated by a bulkhead, shown, so that the ship may still be operated and controlled should one compartment become flooded.

Figure 2:
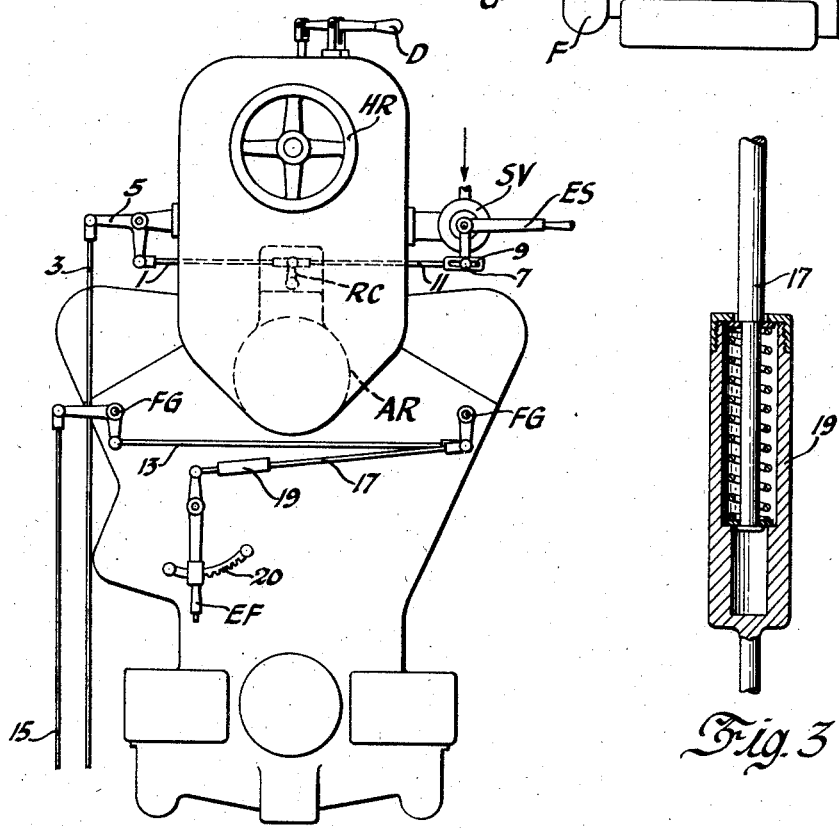
Figure 2 shows the end elevation of one of the engines and details of the emergency controls and connecting linkage thereto.

Each of the engines, as best shown in Figure 2, is provided with air operated reversing means shown generally at AR, a starting air valve SV, fuel governing or regulating means shown generally at FG, hand operated reversing means shown generally at HR, and manual means shown at D whereby only one of the above mentioned reversing means may be rendered operative at a time for the purpose of shifting the engine camshafts to reverse the valve timing to permit starting of the engines in either direction of rotation by air admitted to the engine cylinders through the starting air valve SV. An emergency air starting lever ES and an emergency fuel control lever EF are also shown on each engine to respectively control the air starting valve SV and engine fuel governing means FG in an emergency.

The details of each of the above mentioned engine reversing means, the control means for the air operated means and the interlocking and control means operated by the manually operable means or lever D and also the operating characteristics of these means are clearly described and illustrated in the previously mentioned copending application S. N. 400,482, filed June 30, 1941.

The control means or lever RC for each of the air operated engine reversing means AR is connected to manually operable means about to be described included in one of the control stands C by the links 1 and 3 connected to a bell crank lever 5 shown pivotally mounted on each of the engines. Each of the engine starting air valves SV is provided with a bell crank lever ES, one arm of which is shown provided with a handle to serve as an emergency starting air valve control lever ES. The other arm of this control lever is shown provided with a pin 7 extended through a slot 9 in one end of a link 11, the other end of which is connected to the control means or lever RC. The above pin and slot connection, accordingly, serve as a lost motion connection between the starting air valve SV and the control lever RC of the air operated reversing means AR for the purpose to be described later.

When the emergency air starting lever ES is in the position shown, that is, with the pin 7 in the central portion of the slot 9 of the link 11, the starting air valve SV is in the off position in which starting air to the engine cylinders is cut off. The lever is normally held in this position by any well known means such as centering springs or similar mechanism. The above described linkage, which includes the lost motion connection, permits the operation of the air operated reversing means AR prior to operation of the starting air valve SV when the link 3 is moved in either direction from the position in which it is shown, and this linkage and lost motion connection also permits operation of the starting air valve SV by the emergency air starting lever ES should the air starting means AR or control means therefor fail or should the linkage connected to the control means or lever RC be rendered inoperative. It will be evident that should the air operated reversing means fail, the engine may be reversed by operation of the hand operated means HR and started by operation of the emergency air starting lever ES.

Figure 3:
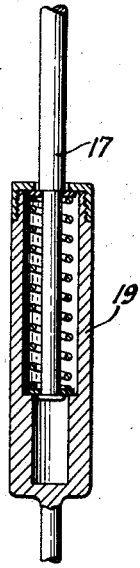
Figure 3 shows a detail of the control linkage shown in Figure 2.

The engine fuel governing or regulating means shown generally at FG in Figure 2 are the conventional control shafts for the fuel injection mechanisms of the engine which, when rotated, control the timing and amount of fuel injected into the engine cylinders in conventional manner, and thereby serve as the means by which the speed, torque and power output of the engine may be varied. The two injector shafts FG of each engine have levers fixed thereon as shown, which are interconnected by a link 13. One end of another link 15 is shown connected to one injector control shaft lever and the other end of this link is operably connected to manually operable means included in one of the control stands C, to be described later. The emergency fuel control lever EF, shown pivotally mounted on the engine, is connected to one of the levers fixed on one of the injector control shafts by means of a link 17 which includes a resilient extensible and compressible connection 19. The details of this resilient connection are clearly shown in Figure 3 and it will be evident that this connection permits restricted movement of the ends of the link 17 relative to each other. The emergency fuel control lever EF is shown provided with a pawl which is normally biased into engagement with the teeth of a quadrant 20 shown fixed on the engine adjacent this lever, and the pawl may be moved out of engagement with the quadrant teeth by a thumb button, shown, which is movably mounted on the lever is a well known manner.

With the above described linkage arrangement movement of the link 15 by manually operable control means about to be described included in a control stand C, the engine fuel governing means FG may be operated to increase or decrease the speed, torque and output of an individual engine as the resilient coupling 19 is compressed for relative movement in either direction of both ends of the link 17 by which the emergency fuel control lever is also connected to the engine fuel governing means, and the emergency fuel control lever, therefore, is not moved when the link is moved. Movement of the engine fuel governing means by the emergency control lever acting through the resilient coupling 19 may take place when the link 15 is permitted to move, as will be subsequently explained.

If desired, instead of the links 13, 15 and 17 being connected directly with the engine fuel governing means they may be connected to conventional speed setting means of a governor driven by the engine which is operably connected to the engine fuel governing means.

The details of each control stand C for controlling one or more engines will now be described in detail by reference to Figures 1 and 4 to 7 of the drawings. Each control stand comprises a housing 21 having independent engine reversing and starting control levers IRS1 and IRS2, independent engine fuel governing control levers IF1 and IF2, and master control levers MRS and MF. The master control lever MRS jointly controls the reversing, starting and braking of a pair of engines, and the master control lever MF controls the fuel governing means FG of a pair of engines in order that the speed, torque and output of the engines may be varied.

Figure 4:
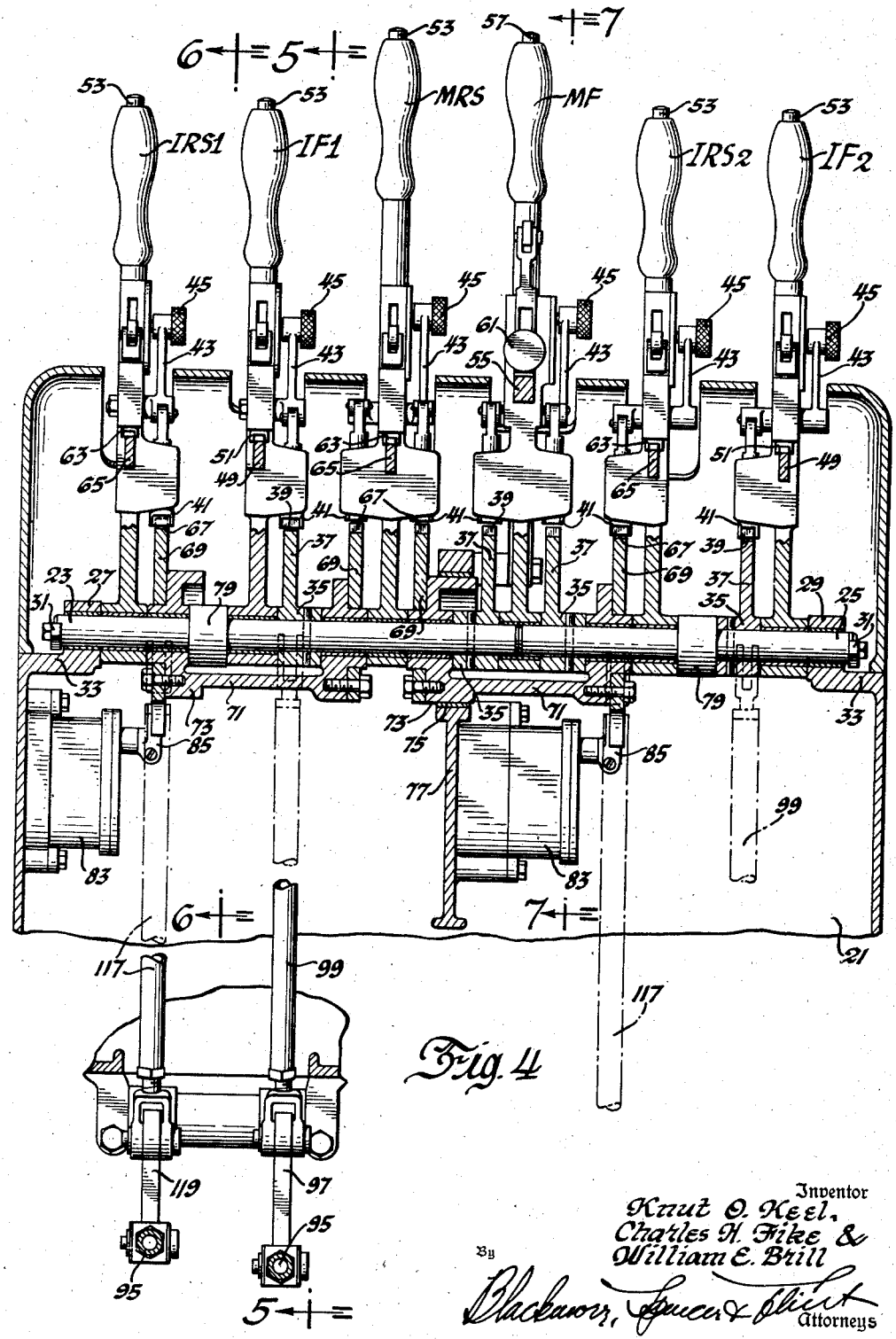
Figure 4 is a partial cross sectional elevation view taken on line 4—4 of Figure 1 of the engine control stand or pedestal.
Figure 5:
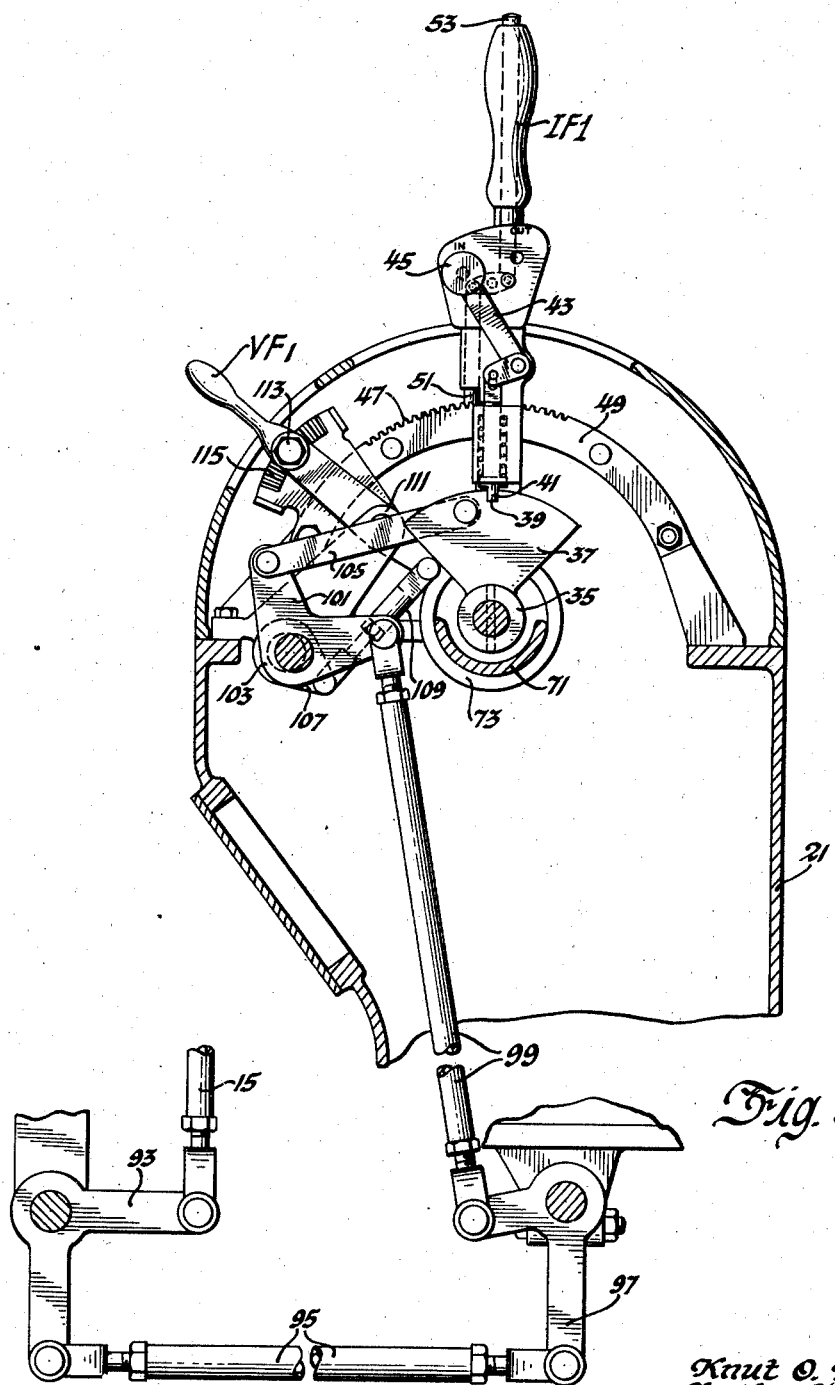
Figures 5 to 7 are views taken, respectively, on lines 5—5 to 7—7 of Figure 4 showing additional details of the control stand and linkage between the various elements thereof.
Figure 6:
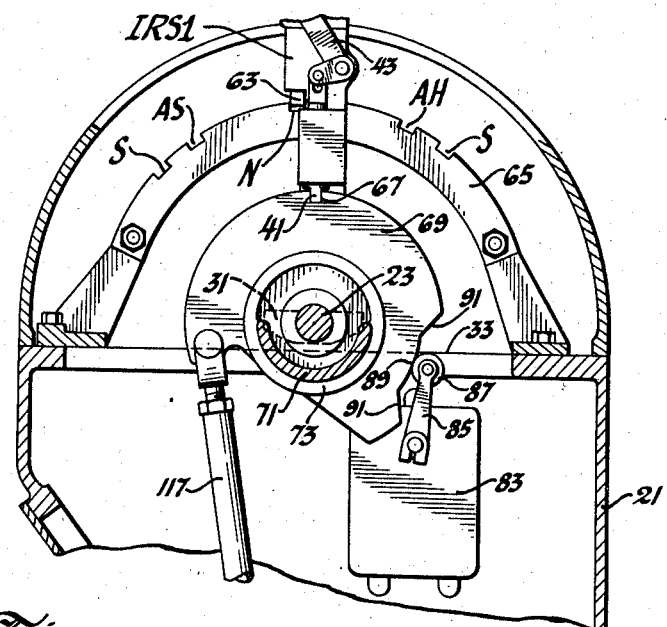
Figure 7:
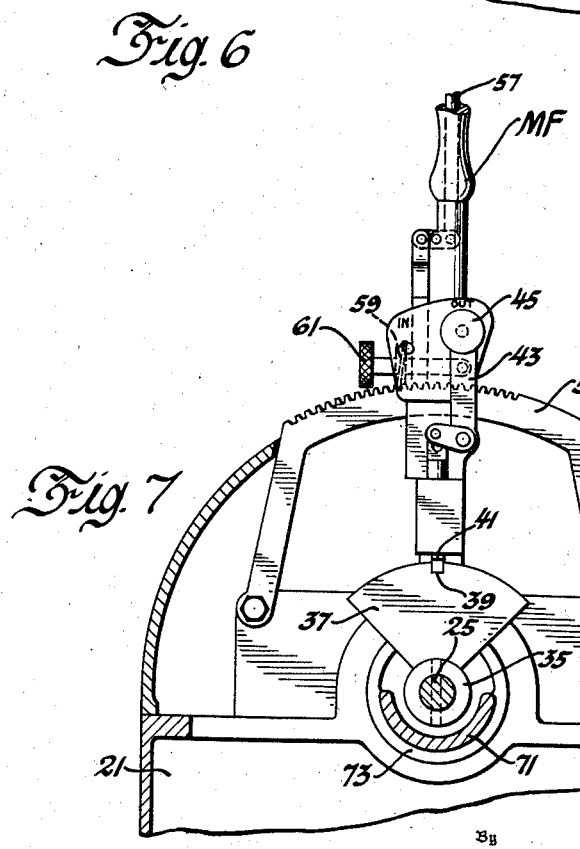

All of the above mentioned control levers are of similar construction and are rotatably mounted at spaced intervals on aligned shafts 23 and 25, which are rotatably supported at their outer ends in bearings 27 and 29 carried by the housing 21. A stop member 31 is fixed transversely on the outer end of each of the shafts 23 and 25 to limit the angular movement of these shafts, the ends of the stop members being engagable with the upper surface of web portions 33 of the housing 21 as best shown in Figures 4 and 6. Collars 35 are pinned to each of the shafts 23 and 25, one collar being fixed on each of the adjacent or inner ends of the shafts and one collar intermediate the ends of each of the shafts. Each of these collars is provided with upstanding wing portions 37 having a slot 39 extending radially toward the center line of the shafts as best shown in Figures 4, 5 and 7. Each of the independent fuel control levers IF1, IF2 is provided with a dog 41 which is slidably mounted in a suitable recess in the lever and the lower end of the dog is formed to enter the slot 39 in the wing portion 37 of the collar fixed intermediate the ends of each shaft adjacent the independent fuel control lever so that each of these levers may be operatively connected to one of the aligned shafts to cause independent angular movement of each of the shafts. The master fuel control lever MF is rotatably mounted on the adjacent or inner ends of both of the shafts 23 and 25 between the collars 35 fixed near the inner ends of these shafts. The lever MF has two dogs 41 slidably mounted in suitable recesses on both sides of the lever. The lower ends of both of these dogs are also formed to enter the slots 39 in the wing portions of the collars 35 fixed adjacent the inner ends of the shafts 23 and 25 in order that the master controller shafts may be operatively connected to both shafts and the collars pinned thereon so that the shafts and collars may be angularly moved simultaneously or in multiple by the master control lever. The dog or dogs of each of the fuel control levers are connected to a bell crank lever 43 pivotally mounted on each of the respective control levers. Each of the bell crank levers 43 is provided with a suitable detent button 45 for holding the bell crank lever in either an "in" or "out" position as best shown in Figures 5, 6 and 7. The two dogs on the master fuel control lever MF are both operatively connected to the bell crank lever pivoted thereon so that they will be moved thereby to either the "in" or "out" position simultaneously. The "in" position for all the bell crank levers causes the lever dogs 41 to be moved into the respective slots 39 in the wing portions 37 of the collars 35 adjacent the levers IF1, MF and IF2.

Means shown in Figure 5 comprising toothed quadrants 49 fixed to the control stand housing 21 and pawls 51 pivotally mounted on each of the independent fuel control levers and biased for engagement with the teeth 47 of the individual quadrants 49 and movable out of engagement with the quadrant teeth by individual thumb buttons 53 are provided so that each of the fuel control levers IF1 and IF2 may be manually moved to and held in any desired position with respect to the quadrants.

A similar toothed quadrant 55 fixed to the control stand housing 21 is provided for the master fuel control lever MF, which is provided with a similar thumb button 57 for moving a pawl 59 comprising a worm out of engagement with the teeth of the quadrant 55 into which the teeth of the worm or pawl are normally biased, as best shown in Figure 7. This worm or pawl is rotatably mounted in the master fuel control lever MF and is provided with a knurled head 61 to rotate the worm and thereby move the control lever slightly with respect to the quadrant teeth. The above described construction, accordingly, serves as a vernier adjusting means for the master fuel control lever MF.

The independent reversing and starting control levers IRS1 and IRS2 are of similar construction, each being provided with similar dogs 41, bell crank levers 43 for operating the dogs having detent buttons 45 for positioning the bell crank levers and dogs in either the "in" or "out" position, and pawls 63 operable by thumb buttons 53. The master reversing and starting control lever MRS, as shown in Figure 4, is also of similar construction to the master fuel control lever, having two dogs 41 operable by a bell crank lever 43 having a detent button 45 and a thumb button 53 operating a pawl 63. Individual quadrants 65 are provided for the reversing and starting control levers IRS1, MRS and IRS2. Each of these quadrants has radial starting slots S near the ends of the quadrants, a neutral radial slot N in the central portion of the quadrant and radial ahead and astern slots AH and AS, respectively, between the neutral and starting slots, as best shown in Figure 6, in which the lever pawls 63 may be positioned to hold these levers in the neutral, ahead, astern, ahead starting or astern starting positions.

The lower ends of the dogs 41 on the reversing and starting control levers IRS1, MRS and IRS2 are formed to engage radial slots 67 in wing shaped flanges 69 fixed on opposite ends of cranked connecting members 71 which are rotatably supported on shafts 23 and 25. The cylindrical surface 73 of one of the cranked members 71 is supported in a bearing 75 formed in a flange 77 of the control stand housing 21 to maintain the inner or adjacent ends of the shafts 23 and 25 in axial alignment, and sleeves 79 are placed on the shafts 23 and 25 adjacent the end position of the cranked members 71 to preserve the axial spacing between the various control levers, as best shown in Figure 4.

Control means is provided for the engine braking means B, previously described, which includes electrical control switches, shown generally at 83 in Figures 4 and 6, mounted on the inside of the control stand housing 21. Each of these switches includes a movable control arm 85 having a roller 87 mounted on the end thereof. The control arms are biased in any well known manner to cause the roller 87 to bear on the outer periphery of the flange members 69 adjacent the independent reversing and starting control levers IRS1 and IRS2. As best shown in Figure 6, the roller 87 is in contact with the central portion of an arcuate surface 89 formed on the flange member 69 when the independent reversing and starting control lever is in the neutral position, as shown, to cause closure of the switch 83 and energization of an engine braking means to stop rotation of the engine. The length of the arcuate surface 89 is such that when the dog 41 of the control lever IRS1 is in the slot 67 in the flange member and this lever is moved to either starting position, that is, with the lever pawl 63 in either of the starting notches S, the flange member 69 will be rotated in either direction an amount necessary to cause either of the cam surfaces 91 formed thereon adjacent the arcuate surface 89 to contact and move the roller and switch control arm 85 clockwise to the open or off position to de-energize the engine braking means. When the other independent starting and control lever IRS2 is engaged with the other flange member and is moved to either starting position identical operation of the other control switch 83 and identical engine braking operation will take place, as this flange member 89 adjacent this lever is of identical form and operates the other control switch in the same manner as previously described.

It will be evident that when both dogs 41 of the master reversing and starting control lever MRS are in the slots 67 in both flange members 89 fixed on adjacent ends of the cranked members 71 and the master lever is in the neutral position, the braking means B of both pairs of engines are simultaneously energized as both switches 83 are closed. Movement of the lever MRS to either starting position causes these switches to be opened to de-energize each of the braking means of a pair of engines.

Each of the previously described linkages, comprising links 13, 15 and 17 operably connected to the individual engine fuel governing means or injector control shafts FG, is operably connected by the following connecting linkage, which also includes vernier adjustment mechanism, to each of the wing portions 37 of the collars 35 located adjacent the independent fuel control levers IF1 and IF2 included in the control stand C. This connecting linkage and vernier mechanism is best shown in Figures 4, 5 and 6. One end of the link 15 is shown connected to a bell crank lever 93 which is pivotally supported in any convenient manner on the ship or engine. The bell crank lever 93 is connected by a link 95 to a similar bell crank lever 97 rotatably supported on the ship in any well known manner. A link 99 is connected between the bell crank lever 95 and one arm of a bell crank lever 101 pivotally supported on an eccentric member 103 which is rotatably supported in a suitable bearing in the control stand housing 21, as best shown in Figure 5. The other arm of the bell crank lever 101 is connected by a link 105 to the wing portion 37 of the collar adjacent each of the independent fuel control levers IF1 and IF2.

The eccentric member 103 is provided with an integral arm 107 which is connected by a link 109 to an independent vernier engine fuel control lever VF1, which is rotatably supported on bracket 111 fixed to the control stand C. The vernier fuel control lever VF1 is provided with a spring biased detent 113 which normally engages the notches in a quadrant 115 fixed to the quadrant 49 to maintain the vernier lever in any position on the quadrant 115 to which it is moved. The other engine link 15 is connected by identical linkage to the other collar 35 adjacent the other independent fuel control lever IF2, and an independent vernier fuel control lever VF2 is also included in this linkage.

It will be evident that with the above described linkage the individual engine fuel regulating means FG may be controlled by movement of the independent fuel control levers IF1 and IF2, and vernier adjustments in the fuel supplied to either engine may be made by movement of the independent vernier fuel control levers VF1 and VF2 which rotate the respective eccentric members 103 and cause a slight movement of the links and levers connecting the independent fuel control levers IF1 and IF2 with the individual engine fuel governing or regulating means FG.

The linkage between each of the flanges 69 adjacent the independent reversing and starting control levers IRS1 and IRS2, as best shown in Figure 4, comprises a link 117 connected between each of these flanges and a bell crank lever 119 pivotally mounted adjacent the bell crank lever 95 (see Figure 1) and any convenient form of linkage, not shown, may be used to connect the bell crank lever 119 to the link 3, such as that shown in Figure 5, so that the individual control means or levers RC for the engine air operated reversing means AR and the individual engine starting air valve ES may be operated in the order previously described by movement of the independent engine reversing and starting control levers IRS1 and IRS2.

Independent reversing, starting and braking of the individual engines and independent variation in the speed, torque and output of the individual engines is accomplished by moving the bell crank levers 43 of the master control levers MRS and MF to the "out" position, and movement of the bell crank levers 43 on the independent levers IRS1, IRS2, IF1 and IF2 to positions whereby the bell crank levers may be moved to the "in" position to cause the lever dogs to be entered in the slots 67 of the flanges 69 to which the individual engine reversing and braking means and individual starting air valves are operatively connected. These flanges may then be moved independently by the respective control levers to cause operation of the individual air operated engine reversing means AR, release of the individual engine braking means B and opening of the individual engine air starting valves SV in the order mentioned when the control levers are moved from the neutral to either the ahead or astern starting positions. Rotation of the individual engines by the air admitted through the air starting valves SV will cause them to start and run, and the control levers may then be moved back to the ahead or astern position adjacent either the AH or AS notches in the quadrants 65. Movement of the levers back to the neutral position from either the ahead or astern position causes operation of the engine braking means to stop rotation of the engines and causes the air operated reversing means to move to the neutral position.

With the dogs 41 of the independent fuel control levers IF1 and IF2 entered into the slots 39 of the collars 35, either collar and the linkage connected between the collar and the individual engine fuel governing means may be moved by the respective control levers in order that the speed, torque and output of the individual engines may be varied. Slight variations in the speed, torque and output of the individual engines may be accomplished by movement of the independent vernier fuel adjustment levers VF1 and VF2, each of which causes rotation of one of the eccentric sleeves 103 to cause a slight movement of the respective linkages between the independent fuel control levers IF1 and IF2 and the respective engine fuel governing means FC. It will be evident that the independent vernier control levers VF1 and VF2 provide means for causing operation of a pair of engines at synchronous speed.

Multiple control of a pair of engines, that is, reversing, starting and braking, is controlled by the master control lever MRS and multiple control of the fuel governing means FG of a pair of engines is controlled by the master fuel control lever MF. Multiple operation is accomplished by moving the dogs of the independent control levers out of the slots in the flanges and collars and moving the master control levers to positions whereby the lever dogs may be moved into the slots in the respective flanges and collars adjacent thereto by means of the bell crank levers of the respective levers.

It will be evident that pairs of engines may be reversed, started and braked by movement of the master control lever MRS and the speed, torque and output of pairs of engines may be controlled by movement of the master fuel control lever. Where two pairs of engines are used, as shown in Figure 1, and the speed, torque and output of each pair is controlled by a master fuel control lever MF, vernier adjustment in the speed, torque and output of each pair of engines is accomplished by rotation of the worm pawl 59 on the master control lever by means of the knurled head 61 formed on the worm pawl, which causes a slight increase or decrease in the speed, torque and output of both engines. By this means both pairs of engines may be operated at synchronous speed and equal output or one pair may be caused to operate at greater speed, torque and output to permit efficient operation of the ship and pairs of engines in cross winds and seas.

The individual engine emergency fuel control levers EF, hand operated reversing means HR and emergency starting air control levers ES enable the speed, torque and output of the individual engines to be adjusted and provide means whereby reversal and starting of the individual engines may be accomplished if the control levers on the control stands are rendered inoperative by movement of the lever dogs 41 to the "out" position, by movement of the respective bell crank levers 43 on the control levers to the "out" position as described above and opening the circuits in any well known manner to the individual engine braking means B.

The above described drive and control system enables a ship to be efficiently operated by means of one or more engines and allows individual engines to be controlled independently, or pairs of engines to be controlled in multiple, and permits prompt maneuvering of the ship by causing operation of one or both propellers in the same or opposite directions of rotation and at the same or different speeds of rotation.

We claim:

1. A multi-engine ship drive and control system, each engine having fuel governing means to govern the speed and power output thereof, reversing means and starting means, independent engine fuel control levers for controlling each of said engine fuel governing means, independent control levers for controlling each of said engine reversing and starting means, a master fuel control lever for controlling all of said engine fuel governing means in multiple, a master reversing and starting control lever for controlling all of said engine reversing and starting means in multiple, and manually operable means associated with each of said control levers to render each selectively operable.

2. In combination with a plurality of reversible internal combustion engines each having reversing means, starting means and braking means, a control stand located remotely with respect to the engines, independent control connections extending between the control stand and the reversing, starting and braking means of each engine for causing operation of said means, independent control levers for controlling each engine and a master control lever for controlling all of the engines simultaneously, each of said independent levers having manually operable means to selectively connect each of said levers to one of the independent control connections, said master control lever also having similar manually operable means for selectively and simultaneously connecting the master control lever to all of said control connections.

3. A multi-engine drive and control system comprising a plurality of driving engines, each engine being provided with reversing, starting and fuel governing means to cause operation thereof in either direction of rotation at any desired speed and power output and control means comprising independent control levers for controlling each engine fuel governing means, independent control levers for controlling each engine reversing and starting means, a master control lever for controlling all of the engine fuel governing means in multiple, a master control lever for controlling all the engine reversing and starting means in multiple and separate manually operable means associated with each of said control levers to render the control levers selectively operable.

4. In combination with a plurality of internal combustion engines each having fuel governing means, an emergency control lever for each of said fuel governing means movably mounted adjacent each engine and having positioning means therefor, a link including a resilient extensible and compressible connection connected between the fuel governing means and said control means, a control stand located remotely with respect to the engines, individual control linkages extending between the control stand and the individual engine fuel governing means, independent engine control levers movably mounted in the control stand each having means for selectively connecting one of said independent control levers to one of said control linkages and a master control lever movably mounted in the control stand having means for selectively and simultaneously connecting the master lever to all of said control linkages.

5. In combination with a plurality of internal combustion engines, each provided with fuel governing means, a control stand located remotely with respect to the engines, individual control linkages extending between the control stand and the individual fuel governing means, independent engine control levers movably mounted on the control stand each having means for selectively connecting one of said independent control levers to one of said linkages for operation thereby, independent vernier control levers movably mounted on said control stand and operably connected to each of said linkages for varying the effective length thereof in small steps and a master control lever also movably mounted on the control stand having means for selectively and simultaneously connecting said master control lever to all of said control linkages for simultaneous operation thereby.

6. A ship drive and control system comprising a propeller shaft, a pair of fluid couplings operably connected thereto, a pair of engines, each operably connected to one of said fluid couplings and provided with a fuel governing device and starting, reversing and braking means, a control stand located at some distance from said engines, fuel control linkage extending between each engine fuel governing device and the control stand, reversing and starting control linkage also extending between each engine reversing and starting means and the control stand, a plurality of control levers movably mounted on the control stand, each having positioning means and manually operable means for selectively connecting certain ones of said levers to one of said engine fuel control linkages and for connecting certain others of said levers to one of said engine reversing and starting linkages, or for connecting one of said levers to all of said engine fuel control linkages, and for connecting another of said levers to all of said engine reversing and starting linkages.

7. In combination with a plurality of reversible internal combustion engines each provided with a power operated reversing means, hand operated reversing means, means for rendering only one of said reversing means operative at one time, starting means, braking means, fuel governing means to vary the speed and output, an emergency control lever having positioning means and resiliently connected to the fuel governing means, and an emergency starting lever directly connected to the starting means, a control stand for said engines having a plurality of independent engine fuel control levers, one for each engine, a plurality of independent engine reversing, starting and braking control levers, one for each engine, a master fuel control lever, and a master reversing, starting and braking control lever, control connections between each engine fuel governing means and the control stand, control connections between each engine power operated reversing means, starting means and braking means and the control stand, and manually operable means on each of said control levers to selectively connect each of the independent control levers to one of said control connections or to selectively connect one of said master levers to all of said first mentioned control connections and to connect the other master control lever to all of said second mentioned control connections.

8. A drive and control system for a ship comprising a plurality of driving and control units, each of the units comprising a plurality of engines, a fluid driving coupling on each engine, a propeller shaft, a reduction gear unit interposed between the fluid couplings and propeller shaft and a control stand, each of said engines having reversing, starting, braking and speed regulating means, separate control connections between the speed regulating means of each engine and the control stand, separate control connections between the reversing, starting and braking means of each engine and the control stand, and a plurality of independent and master control levers movably mounted in the control stand, certain of said independent control levers being adapted to be operatively connected to separate engine speed regulating control connections, certain other of said independent control levers adapted to be operatively connected to said separate engine reversing, starting and braking control connections, one of said master control levers adapted to be simultaneously connected to all of the engine speed control linkage connections and another of said master control levers adapted to be connected to all of the engine reversing, starting and braking control connections, and manually operable connecting means for selectively connecting each of the control levers to the control linkages in the above described manner.

9. A ship drive and control system comprising a propeller shaft, a pair of engines, a pair of fluid couplings, each operably connected to each of said engines, reduction gearing connected between the propeller shaft and both of said fluid couplings, each engine being provided with fuel governing means, reversing means, starting means and braking means, individual engine fuel governing control connections including a vernier fuel control lever and means operably connected to said connections and said vernier lever for causing slight adjustments in said engine fuel governing means, individual engine control connections for jointly controlling the reversing, starting and braking means of each engine in the order mentioned, a control stand for said engines comprising a pair of independent engine fuel control levers, each having manually operable means for selectively connecting each of said levers to one of said individual engine fuel control connections, a pair of independent reversing, starting and braking control levers each having manually operable means for selectively connecting each of said levers to one of said engine reversing, starting and braking control connections, a master fuel control lever having combined manually operable vernier adjustment and positioning means therefor and manually operable means for selectively connecting said lever to both of said engine fuel control connections simultaneously, and a master reversing, starting and braking control lever having manually operable means for selectively connecting said lever to both of said engine reversing, starting and braking control connections simultaneously.

KNUT O. KEEL.
CHARLES H. FIKE.
WILLIAM E. BRILL.